(12) United States Patent
You et al.

(10) Patent No.: US 12,281,236 B2
(45) Date of Patent: Apr. 22, 2025

(54) WASTE-CLOTH-CONTAINING RECOVERED FIBER COATING SLURRY AND COATING, AND PREPARATION METHOD THEREOF

(71) Applicant: FUJIAN HUAFENG SPORTING GOODS SCIENCE & TECHNOLOGY CO., LTD, Fujian (CN)

(72) Inventors: Xun You, Fujian (CN); Huayu Fang, Fujian (CN); Xingsheng Jiang, Fujian (CN); Thomas Waltherschmidt, Fujian (CN); Tianyuan Li, Fujian (CN); Peng Lin, Fujian (CN); Meng Liu, Fujian (CN); Ke Chen, Fujian (CN); Jianhan Wu, Fujian (CN)

(73) Assignee: FUJIAN HUAFENG SPORTING GOODS SCIENCE & TECHNOLOGY CO., LTD, Putian (CN)

( * ) Notice: Subject to any disclaimer, the term of this patent is extended or adjusted under 35 U.S.C. 154(b) by 796 days.

(21) Appl. No.: 17/601,108

(22) PCT Filed: Aug. 17, 2020

(86) PCT No.: PCT/CN2020/109488
§ 371 (c)(1),
(2) Date: Oct. 4, 2021

(87) PCT Pub. No.: WO2022/036496
PCT Pub. Date: Feb. 24, 2022

(65) Prior Publication Data
US 2022/0325132 A1    Oct. 13, 2022

(51) Int. Cl.
*C09D 175/04*    (2006.01)
*C09D 7/40*    (2018.01)
*C09D 7/65*    (2018.01)
*C09D 11/102*    (2014.01)

(52) U.S. Cl.
CPC ............. *C09D 175/04* (2013.01); *C09D 7/65* (2018.01); *C09D 7/70* (2018.01); *C09D 11/102* (2013.01)

(58) Field of Classification Search
CPC ................................ C09D 7/70; C09D 175/04
See application file for complete search history.

(56) References Cited

U.S. PATENT DOCUMENTS

2004/0028826 A1* 2/2004 Goecke .................... B44C 1/00
427/407.1
2010/0266774 A1* 10/2010 Yang ........................ D06N 3/14
427/389.9

FOREIGN PATENT DOCUMENTS

| CN | 101838471 A |   | 9/2010 |
| CN | 109249647 A |   | 1/2019 |
| CN | 111235922 A | * | 6/2020 |

OTHER PUBLICATIONS

Textiles—Tear properties of fabrics—Part 3: Determination of tear force of trapezoid-shaped test specimens, National Standard of the People's Republic of China, Mar. 19, 2009, pp. 1-3, GB/T 3917.3-2009, correspond to ISO 9073-4:1997, Textiles—Test methods for nonwovens—Part 4: Determination of tear resistance, MOD.
Textiles—Determination of the abrasion resistance of fabrics by the Martindale method—Part 3: Determination of mass loss, National Standard of the People's Republic of China, Nov. 12, 2007, pp. 1-6, GB/T 21196.3-2007, correspond to ISO 12947-3:1998, MOD.

* cited by examiner

*Primary Examiner* — Vickey Nerangis

(57) ABSTRACT

The invention belongs to the technical field of waste cloth recovering and reusing, and particularly relates to waste-cloth-containing recovered fiber coating slurry and coating, and a preparation method thereof. 0.5-8 parts by weight of recovered fiber of waste cloth, 95-110 parts by weight of waterborne polyurethane, and 4-6 parts by weight of curing agent are prepared into recovered fiber coating slurry. The recovered fiber coating slurry is printed on a base cloth or a base plate, and dried to obtain a recovered fiber coating having a thickness of 0.1-1.0 mm. According to the technical solution provided by the invention, the field of physical method recycling of waste cloth is expanded to coating. Because the particle size of recovered fiber of the waste cloth is fine, the recovered fiber coating obtained by mixing waterborne polyurethane with a curing agent in a proper proportion has excellent abrasion resistance and mechanical properties.

3 Claims, 1 Drawing Sheet

WASTE-CLOTH-CONTAINING RECOVERED FIBER COATING SLURRY AND COATING, AND PREPARATION METHOD THEREOF

TECHNICAL FIELD

The present invention belongs to the technical field of waste cloth recovering and reusing, and particularly relates to waste-cloth-containing recovered fiber coating slurry and coating, and a preparation method thereof.

BACKGROUND ART

With the improvement of people's living standards, the amount of waste cloth in municipal solid waste is increasing year by year. By the end of 2019, China's total output of waste cloth is about 200 million tons. In addition, China will increase at least 30 million tons of waste cloth each year, but the recycling rate is less than 10%. Waste cloth treatment is facing significant challenges. Based on the enhancement of environmental protection awareness, resource saving, and sustainable demand, the recovering and reusing of waste cloth has been paid more and more attention.

At present, the recovering and reusing methods of waste cloth mainly include chemical methods and physical methods. The physical recovering method is simple and economical, mainly including steps of sorting, cleaning, and drying the collected waste cloth, crushing the collected waste cloth, and directly carrying out melt spinning or bottle making or the process for preparing other products. The property of the regenerated product is poor, and the regenerated product is relatively low-end. The chemical method refers to a process that waste cloth is depolymerized into a polymerization monomer or a polymerization intermediate by utilizing a chemical reaction, and is subjected to regeneration and polymerization and melt spinning after steps of purification and separation, and the like. At present, the chemical recovering methods on the market mainly include: hydrolysis, alcoholysis, ammonolysis, aminolysis, pyrolysis and other degradation methods. However, the chemical recycling of waste cloth requires a lot of instruments and equipment, the production process is complicated, and the requirement on the technical level is high.

According to the traditional physical method for recovering the waste clothes or cloth, the crushing step is necessary. But the waste cloth fragments cut by the existing crusher or breaker for the waste cloth are large in size and different in thickness, and the application field and scenario are limited. The following patent documents disclose a physical recycling treatment technology for waste cloth. The Chinese present invention patent application CN201811240099.7, "A method for manufacturing a plastic package containing waste cloth shreds", discloses a method for manufacturing a plastic package containing waste cloth shreds. The waste cloth is twisted into shreds and is matched with a plastic packaging bag to enhance the strength of the plastic package, improve the repeating utilization factor, and effectively reduce the generation of plastic package waste. However, according to the technical solution, the waste cloth is simply cut and then is bonded with a plastic bag through glue. The strength of the plastic bag is not really enhanced, the application of a large amount of glue is likely to cause the plastic bag to have a stinging peculiar smell, and the safety of the plastic bag can also be reduced.

In the application aspect of the waste cloth fiber composite material, as the size of the waste cloth to be cut is not fine enough, the recycling effect of the waste cloth is affected. The Chinese present invention patent application CN101838471A, "Textile fiber reinforcement resin-based composite material and production process thereof" discloses a textile fiber reinforcement resin-based composite material and production process thereof, which relate to composite materials. A resin-based composite material is included, wherein fiber used for reinforcing the property of the resin-based composite material is mixed in the resin-based composite material and comprises textile fiber. The production process of the textile fiber reinforcement resin-based composite material comprises a fiber manufacturing procedure and a resin-based composite material production procedure, wherein the fiber manufacturing procedure comprises the following steps of: (1) selecting a fabric containing the textile fiber; (2) manufacturing into small pieces by a fabric breaking machine; and (3) beating the small pieces into the textile fiber. In the technology, the crushed textile fiber is large in particle size, and the prepared reinforced resin-based composite material is rough in surface and poor in flatness. Although the strength is reinforced, the property reinforcement effect and the application range of bending resistance and cracking resistance are limited. The waste cloth is changed into the fine fiber powder and then utilized, which is a brand-new path for recycling the waste cloth by a physical method. However, due to the electrostatic characteristics of the components of the waste cloth, the difficulty of manufacturing the fine fiber powder from the waste cloth is greatly increased.

SUMMARY OF THE PRESENT INVENTION

In view of the above technical problems existing in the background art, there is a need to provide waste-cloth-containing recovered fiber coating slurry and coating and a preparation method thereof. The recovered fiber coating slurry containing waste cloth should contain recovered fiber of waste cloth in a certain proportion, the fiber coating containing waste cloth needs to have excellent bending resistance and mechanical properties, and the source of waste cloth raw materials which can be adopted in the preparation method should be wide such that the purpose of reducing the pressure of waste cloth on the environment and playing the positive role of waste cloth resources can be really achieved.

In order to achieve the above objects, in a first aspect of the present invention, the inventor provides a recovered fiber coating slurry containing waste cloth, which includes the following components in parts by weight: 0.5-8 parts of recovered fiber of waste cloth, 95-110 parts of waterborne polyurethane, and 4-6 parts of curing agent.

Different from the prior art, the above-mentioned technical solution has at least the following beneficial effects.

According to the recovered fiber coating slurry containing waste cloth of the present invention, recovered fiber coating slurry is prepared from the recovered fiber of waste cloth, waterborne polyurethane, and a curing agent, and the field of physical method recycling of the waste cloth is expanded to the coating field. Because the particle size of recovered fiber of the waste cloth is fine, the recovered fiber coating slurry obtained by mixing waterborne polyurethane with a curing agent in a proper proportion has excellent dispersibility and stability.

In a second aspect of the present invention, the inventor provides a preparation method for a recovered fiber coating containing waste cloth, comprising the steps of:

preparing recovered fiber: crushing waste cloth, and sieving to obtain recovered fiber, wherein the waste cloth is one or more of chemical fiber, cotton, linen, silk, wool fabric, and blended cloth;

preparing recovered fiber coating slurry: uniformly mixing 0.5-8 parts by weight of the recovered fiber, 95-110 parts by weight of waterborne polyurethane, and 4-6 parts by weight of a curing agent to obtain recovered fiber coating slurry;

and printing: printing the recovered fiber coating slurry on a base cloth or a base plate, and drying to obtain a recovered fiber coating containing waste cloth.

In a third aspect of the present invention, the inventor provides a recovered fiber coating containing waste cloth which is prepared according to the preparation method according to the second aspect of the present invention, and the thickness of the recovered fiber coating is 0.1-1.0 mm.

Different from the prior art, the above-mentioned technical solution has at least the following beneficial effects.

The recovered fiber coating slurry is obtained by mixing recovered fiber prepared from waste cloth, waterborne polyurethane, and a curing agent in a certain proportion. The recovered fiber coating slurry is printed on a base cloth and dried to obtain a recovered fiber coating containing the waste cloth. The technology is simple and easy to operate. The bending resistance, the abrasion resistance, and the mechanical property of the recovered fiber coating containing waste cloth are greatly enhanced. The recycling way of the waste cloth is enriched, the added value of the waste cloth is improved, and the negative influence of the waste cloth on the environment is alleviated.

DETAILED DESCRIPTION OF THE PRESENT INVENTION

Figure 1:
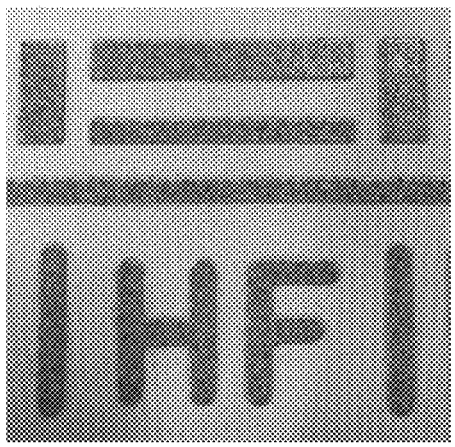
FIG. 1 is a sample picture of recovered fiber coating containing waste cloth (40-mesh) according to a preferred embodiment.

Hereinafter, the recovered fiber coating slurry containing the waste cloth according to the first aspect of the present invention, the preparation method for the recovered fiber coating containing the waste cloth according to the second aspect of the present invention, and the recovered fiber coating containing the waste cloth according to the third aspect of the present invention will be described in detail.

First, the recovered fiber coating slurry containing waste cloth according to the first aspect of the present invention will be described.

The present invention discloses a recovered fiber coating slurry containing waste cloth, which includes the following components in parts by weight: 0.5-8 parts of recovered fiber of waste cloth, 95-110 parts of waterborne polyurethane, and 4-6 parts of curing agent.

Preferably, the waste cloth is one or more of chemical fiber, cotton, linen, silk, wool fabric, and blended cloth.

Preferably, the curing agent is an isocyanate.

The recovered fiber coating slurry containing waste cloth according to the present invention can be used for preparing various coatings, but other applications of the recovered fiber coating slurry containing waste cloth in the non-coating field are not limited thereby.

Next, the preparation method for the recovered fiber coating containing waste cloth according to the second aspect of the present invention is described.

The present invention discloses a preparation method for a recovered fiber coating containing waste cloth, which includes the following steps:

preparing recovered fiber: crushing waste cloth, sieving to obtain recovered fibers, wherein the waste cloth is one or more of chemical fiber, cotton, linen, silk, wool fabric, and blended cloth;

preparing recovered fiber coating slurry: uniformly mixing 0.5-8 parts by weight of the recovered fiber, 95-110 parts by weight of waterborne polyurethane, and 4-6 parts by weight of a curing agent to obtain recovered fiber coating slurry, wherein the curing agent is isocyanate;

and printing: printing the recovered fiber coating slurry on a base cloth or a base plate, and drying to obtain a recovered fiber coating containing waste cloth.

According to the present invention, the lignocellulose high-concentration, medium-concentration, or the low-concentration pulping machine is adopted for crushing the waste cloth, and the process control of hot grinding under pressure avoids the problems of fiber powder flying and uneven fiber particle thickness caused by static electricity in the cutting process of the traditional waste cloth fiber. After the crushing step, the waste cloth fiber powder is enabled to pass through a sieve with a specific mesh number, and it is ensured that the obtained recovered fiber powder is with fine and uniform size. The raw material source of the waste cloth is not particularly limited, and can be selected from any one of chemical fiber, cotton, linen, silk, wool fabric and blended cloth or any mixture thereof. Chemical fiber raw materials may be, for example, but not limited to, polyester, acrylic, chinlon, polypropylene, vinylon, specialty fibers, and the like. The curing agent isocyanate applied in the present invention can realize slow curing, prolong the printing active time of the slurry, and has the advantages of fewer bubbles, high transparency, and better mechanical property in the coating using the isocyanate curing agent.

In preferred embodiments, the substrate of recovered fiber coating can be cloth. In other embodiments, the recovered fiber slurry may also carry out printing coating on a base plate which includes, but is not limited to, a plastic plate, a metal plate, a glass plate, etc.

Besides, in order to maintain optimum application property of the recovered fiber coating slurry, it should be used as soon as possible, preferably printing being carried out within 2 hours after it is prepared.

Preferably, the waste cloth is crushed by using a fiber pulping machine, and the feeding speed of the waste cloth is 60-300 kg/h, and the steam pressure is 4-16 bar.

Preferably, during sieving, a 20-40-mesh sieve is used. In order to ensure that the cloth recovery rate reaches more than 50% without affecting the property and appearance of the printed product, a sieve with the range is selected.

Preferably, the waterborne polyurethane has a particle size of 0.001-0.1 µm. The waterborne polyurethane with the range is more suitable for coating thickening and ensures the mechanical property of the coating.

Preferably, the printing is one of screen printing, plate making printing, roller painting, thin coating, and knife coating, and the thickness of the printing coating slurry is 0.1-1 mm, and the drying temperature is 60-80° C.

Preferably, the step of preparing the recovered fiber coating slurry later on further includes vacuumizing to remove bubbles under a vacuum degree of −0.095-0.1 mPa.

Finally, a recycled fiber coating containing waste cloth according to the third aspect of the present invention is described. A recovered fiber coating containing waste cloth is prepared according to the preparation method according to the second aspect of the present invention, and the thickness of the recovered fiber coating is 0.1-1.0 mm.

In order to explain the technical content, structural features, achieved objects, and effects of the technical solution in detail, the detailed description will be given below in conjunction with preferred embodiments and accompanying drawings. It is to be understood that these embodiments are merely illustrative of the present application and are not intended to limit the scope of the present application.

Embodiment 1: A Waste-Cloth-Containing Recovered Fiber Coating Slurry and Coating, and a Preparation Method Thereof Preparing recovered fiber: crushing waste mixed-color polyester cloth by using an Andritz mill, wherein during crushing, the feeding speed of the waste cloth is 60-300 kg/h, the steam pressure of the Andritz mill is 4-16 bar, and it passes through a 40-mesh sieve to obtain a recovered fiber with the average particle size of less than or equal to 40-mesh;

preparing recovered fiber coating slurry: uniformly mixing 40-mesh recovered fiber with waterborne polyurethane with the particle size of 0.001-0.1 µm, adding isocyanate curing agent, and uniformly stirring to obtain recovered fiber coating slurry, wherein the mass ratio of the recovered fiber, the waterborne polyurethane, and the isocyanate curing agent is 0.5:100:4;

and screen printing: preparing a 40-mesh screen printing plate or preparing a prepared screen printing plate in advance, silk-screening the prepared recovered fiber coating slurry on the base surface of the cloth within 2 hours, and drying the silk-screened coating at 60-80° C. to obtain the recovered fiber coating with the thickness of 0.5 mm. FIG. 1 shows a sample of a recovered fiber coating containing waste cloth (40-mesh).

Figure 2:
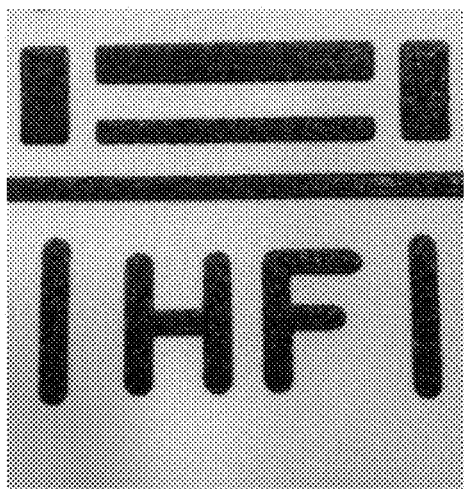
FIG. 2 is a sample picture of recovered fiber coating containing waste cloth (20-mesh) according to a preferred embodiment.

Embodiment 2: A Waste-Cloth-Containing Recovered Fiber Coating Slurry and Coating, and a Preparation Method Thereof Preparing recovered fiber: crushing waste blue acrylic fiber cloth by using an Andritz mill, wherein during crushing, the feeding speed of the waste cloth is 60-300 kg/h, the steam pressure of the Andritz mill is 4-16 bar, and it passes through a 20-mesh sieve to obtain a recovered fiber with the average particle size of less than or equal to 20-mesh;

preparing recovered fiber coating slurry: uniformly mixing 20-mesh recovered fiber with waterborne polyurethane with the particle size of 0.001-0.1 µm, adding isocyanate curing agent, and uniformly stirring to obtain recovered fiber coating slurry, wherein the mass ratio of the recovered fiber, the waterborne polyurethane, and the isocyanate curing agent is 1.5:95:6;

and screen printing: preparing a 20-mesh screen printing plate or preparing a prepared screen printing plate in advance, silk-screening the prepared recovered fiber slurry on the base surface of the cloth within 2 hours, controlling the printing thickness to be 0.1 mm, and drying the silk-screened coating at 60-80° C. to obtain the recovered fiber coating with the thickness of 0.1 mm. FIG. 2 shows a sample of a recovered fiber coating containing waste cloth (20-mesh).

Embodiment 3: A Waste-Cloth-Containing Recovered Fiber Coating Slurry and Coating, and a Preparation Method Thereof Preparing recovered fiber: crushing waste white cotton by using an Andritz mill, wherein during crushing, the feeding speed of the waste cloth is 60-300 kg/h, the steam pressure of the Andritz mill is 4-16 bar, and it passes through a 30-mesh sieve to obtain a recovered fiber with the average particle size of less than or equal to 30-mesh;

preparing recovered fiber coating slurry: uniformly mixing 30-mesh recovered fiber with waterborne polyurethane with the particle size of 0.001-0.1 µm, adding isocyanate curing agent, and uniformly stirring to obtain the slurry containing recovered fiber, wherein the mass ratio of the recovered fiber, the waterborne polyurethane, and the isocyanate curing agent is 5:110:4;

and screen printing: preparing a 30-mesh screen printing plate or preparing a prepared screen printing plate in advance, silk-screening the prepared recovered fiber slurry on the base surface of the cloth within 2 hours, controlling the printing thickness to be 1.0 mm, and drying the silk-screened coating at 60-80° C. to obtain the recovered fiber coating with the thickness of 1.0 mm.

Embodiment 4: A Waste-Cloth-Containing Recovered Fiber Coating Slurry and Coating, and a Preparation Method Thereof Preparing recovered fiber: crushing waste grey linen by using a lignin fiber low-concentration mill, wherein during crushing, the feeding speed of the waste cloth is 60-300 kg/h, the steam pressure of the lignin fiber low-concentration mill is 4-16 bar, and it passes through a 40-mesh sieve to obtain a recovered fiber with the average particle size of less than or equal to 40-mesh;

preparing recovered fiber coating slurry: uniformly mixing 40-mesh recovered fiber with waterborne polyurethane, adding isocyanate curing agent, and uniformly stirring to obtain the slurry containing recovered fiber, wherein the mass ratio of the recovered fiber, the waterborne polyurethane, and the isocyanate curing agent is 8:110:4;

vacuumizing the recovered fiber coating slurry to remove bubbles under a vacuum degree of −0.095-0.1 mPa;

and knife coating printing: knife coating the prepared recovered fiber slurry on a plastic base plate within 2 hours, controlling the knife coating thickness to be 0.5 mm, and drying the knife coated coating at 60-80° C. to obtain the recovered fiber coating with the thickness of 0.5 mm.

The recovered fiber coating cloth containing waste cloth prepared in embodiments 1-5, the blank coating cloth prepared in comparative example 1, and the cloth base material before coating are subjected to a coated fabric tearing strength test and an abrasion resistance test.

The tearing strength testing method comprises steps as follows: according to GB/T3917.3-2009 "Textiles-Tear Properties of Fabrics-Part 1: Determination of Tear Force of Trapezoid-shaped Test Specimens", the tearing strength of coated fabrics is determined by adopting a YG0268 electronic fabric strength tester.

The abrasion resistance testing method comprises steps as follows: the method is carried out according to GB/T 21196.3-2007 "Textiles-Determination of the Abrasion Resistance of Fabrics by the Martindale Method-Part 3: Determination of Mass Loss" by adopting a GT-7012-M abrasion resistance tester to test.

The tear strength and abrasion tester test results for the coated fabric and the cloth without the coating of embodiments 1-5 and comparative example 1 are shown in Table 1.

TABLE 1

The tear strength and abrasion resistance index test results for the coated fabric of embodiments 1-5 and comparative example 1

| Sample | Cloth Before Coating | Comparative Example 1 | Embodiment 1 | Embodiment 2 | Embodiment 3 | Embodiment 4 | Embodiment 5 |
|---|---|---|---|---|---|---|---|
| Tear Strength/N | 59.23 | 66.27 | 74.90 | 69.01 | 83.36 | 82.90 | 67.59 |
| Abrasion Resistance Index (times/mg) | None | 32 | 29 | 23 | 18 | 11 | 20 |

Embodiment 5: A Waste-Cloth-Containing Recovered Fiber Coating Slurry and Coating, and a Preparation Method Thereof Preparing recovered fiber: crushing waste blended cloth by using a lignin fiber medium-concentration mill, wherein during crushing, the feeding speed of the waste cloth is 60-300 kg/h, the steam pressure of the lignin fiber medium-concentration mill is 4-16 bar, and it passes through a 30-mesh sieve to obtain a recovered fiber with the average particle size of less than or equal to 30-mesh;

preparing recovered fiber coating slurry: uniformly mixing 30-mesh recovered fiber with waterborne polyurethane, adding isocyanate curing agent and uniformly stirring to obtain recovered fiber coating slurry, wherein the mass ratio of the recovered fiber, the waterborne polyurethane, and the isocyanate curing agent is 5:110:4;

vacuumizing the recovered fiber coating slurry to remove bubbles under a vacuum degree of −0.095-0.1 mPa;

and printing: thin coating the prepared recovered fiber coating slurry on a metal base plate within 2 hours by 0.5 mm, and drying at 60-80° C. to obtain the recovered fiber coating with the thickness of 0.5 mm.

Comparative Example 1: Blank Coating Preparation

Comparative example 1 differs from Example 1 in that: the recovered fiber is not added into the coating slurry, and all the coating slurry is prepared by uniformly mixing the waterborne polyurethane and the isocyanate curing agent in a mass ratio of 115:5.

From the results of Table 1, it can be seen that the tear strength of the coated fabric containing recovered fiber of embodiments 1-5, which adopt recovered fiber containing waste cloth, is greater than that of comparative example 1 and the cloth before using coating. The tear strength of the coated fabric obtained in embodiment 3 is superior to that of other embodiments, indicating that both the content of the waste cloth in the coating slurry and the thickness of the coating have an influence on the tear strength. Because the recovered fibers after the waste cloth is crushed are uniformly dispersed in the dispersion system of the waterborne polyurethane, stress dispersion is facilitated, the enhancement of the waterborne polyurethane coating by the fibers is realized, the technical field of recycling of the waste cloth is expanded, and a good way is provided for recycling the waste cloth by a physical method.

It should be noted that although the above-mentioned embodiments have been described herein, the scope of the present invention is not limited thereby. Therefore, based on the innovative concept of the present invention, changes and modifications made to the embodiments described herein, or equivalent structures or equivalent process transformations made by using the content of the description and drawings of the present invention, and direct or indirect application of the above technical solutions in other related technical fields, are all included in the scope of patent protection of the present invention.

The invention claimed is:

1. A recovered fiber coating slurry containing waste cloth, consisting of components as follows in parts by weight:

0.5-8 parts of recovered fiber of waste cloth, 95-110 parts of waterborne polyurethane, and 4-6 parts of curing agent.

2. The recovered fiber coating slurry containing waste cloth according to claim 1, characterized in that the waste cloth is one or more of chemical fiber, cotton, linen, silk, wool fabric, and blended cloth.

3. The recovered fiber coating slurry containing waste cloth according to claim 1, characterized in that the curing agent is isocyanate.

\* \* \* \* \*